United States Patent [19]

Nguyen

[11] Patent Number: 5,194,105
[45] Date of Patent: Mar. 16, 1993

[54] PLACEMENT AND BONDING TECHNIQUE FOR OPTICAL ELEMENTS

[75] Inventor: Hung N. Nguyen, Bensalem, Pa.

[73] Assignee: American Telephone and Telegraph Company, New York, N.Y.

[21] Appl. No.: 752,140

[22] Filed: Aug. 29, 1991

[51] Int. Cl.$^5$ .................. H01L 21/603; H05K 13/04; B25J 15/06
[52] U.S. Cl. .................... 156/293; 156/580; 385/14; 385/49; 385/50; 269/21; 269/903; 294/64.1; 279/3
[58] Field of Search ............... 385/14, 49, 50; 269/21, 269/903, 902; 901/40; 294/64.1; 279/3; 156/293, 580, 583.1

[56] References Cited

U.S. PATENT DOCUMENTS

| | | | |
|---|---|---|---|
| 4,542,572 | 9/1985 | Hopp et al. | 269/903 X |
| 4,562,632 | 1/1986 | Parchet et al. | 269/903 X |
| 4,623,156 | 11/1986 | Moisson et al. | 269/903 X |
| 4,750,799 | 6/1988 | Kawachi et al. | |
| 4,852,247 | 8/1989 | Hawkswell | 294/64.1 |
| 4,887,351 | 12/1989 | Porterfield et al. | 294/64.1 |
| 4,892,374 | 1/1990 | Ackerman et al. | 385/14 X |
| 4,904,936 | 2/1990 | Blonder | |
| 5,113,578 | 5/1992 | Jackson et al. | 294/64.1 X |
| 5,124,281 | 6/1992 | Ackerman et al. | 437/209 |

*Primary Examiner*—Jeff H. Aftergut

[57] ABSTRACT

Apparatus (11) is robotically operated to pick up an optical element such as a ball lens (12) or an optical fiber, place it in a groove or depression (13) of a substrate (14), and apply pressure to it so that it is bonded to the substrate. The tool comprises a retracting element holder (17) surrounding a bonding tool (16). A vacuum channel (18) communicates with the element holder so that, by the application of a vacuum, it can pick up an optical element. The tool then moves the element to place it, for example, in a depression (13) of a substrate, whereupon the vacuum is released, thereby to allow the element to nest between opposing sidewalls of the depression. The retracting holder element is simultaneously retracted vertically upwardly so as to expose a bonding surface of the bonding tool. After the element has nested in the groove, the bonding tool contacts the element and forces it against opposite sidewalls to effect a thermo-compression bond of the optical element with the sidewalls.

11 Claims, 2 Drawing Sheets

PLACEMENT AND BONDING TECHNIQUE FOR OPTICAL ELEMENTS

TECHNICAL FIELD

This invention relates to placement and bonding techniques and, more particularly, to methods and apparatus for bonding elements such as glass spheres and optical fibers to substrates.

BACKGROUND OF THE INVENTION

Optical systems typically require a number of photonics modules for operating on lightwaves and coupling light to and from optoelectronic devices such as lasers, light emitting diodes, and photodetectors. The fundamental components of such photonics modules include optical fibers for transmitting light and spherical lenses for efficiently coupling light to and from optoelectronic devices and optical fibers. Silicon is a favored material for the construction of photonics modules because of the precision with which support walls can be formed in silicon for supporting and aligning the various optoelectronic devices, spherical or ball lenses, and optical fibers.

The copending patent application of A. Coucoulas, Ser. No. 679,506, filed Apr. 2, 1991, describes a method for bonding optical fibers and glass ball lenses to aluminum surfaces. Aluminum can easily be coated on the silicon surface and, using the Coucoulas method, one can avoid the need for epoxies or other adhesives by using heat and pressure to bond the glass elements to the aluminum.

In the commercial production of apparatus such as photonics modules, it would be desirable to use machines for placing and bonding optical elements to the substrate. Since such elements must be located with precision, it has been difficult to provide robotic apparatus which is capable of placing elements with the required precision and also applying the pressure to them needed for bonding in accordance with the Coucoulas technique. Separate placement and bonding, of course, increases the expense of the process, and it would be desirable to provide equipment capable of placing and bonding optical elements to a substrate in a single step.

SUMMARY OF THE INVENTION

The invention comprises a tool that can be robotically operated to pick up an optical element such as a ball lens or an optical fiber, place it in a groove or depression of a substrate, and apply pressure to it so that it is bonded to the substrate. The tool comprises a retracting element holder surrounding a bonding tool. A vacuum channel communicates with the element holder so that, by the application of a vacuum, it can pick up an optical element. The tool then moves the element to place it, for example, in a depression of a substrate, whereupon the vacuum is released, thereby to allow the element to nest between opposing sidewalls of the depression. The retracting element holder is simultaneously retracted vertically upwardly to expose a bonding surface of the bonding tool. After the element has nested in the groove, the bonding tool contacts the element and forces it against opposite sidewalls of the depression to bond the optical element to the sidewalls.

An advantage of the invention is that a single tool functions both to place the optical element in the groove and to make the thermo-compression bond, which shortens the manufacturing cycle with respect to systems which would require separate cycles and separate tools for accomplishing these functions. The step of allowing the element to nest in the depression permits a natural alignment of the optical element within the depression and causes applied forces to be distributed symmetrically during the bonding step. These and other objects, features, and advantages of the invention will be better understood from a consideration of the following detailed description taken in conjunction with the accompanying drawing.

DETAILED DESCRIPTION

Figure 1:
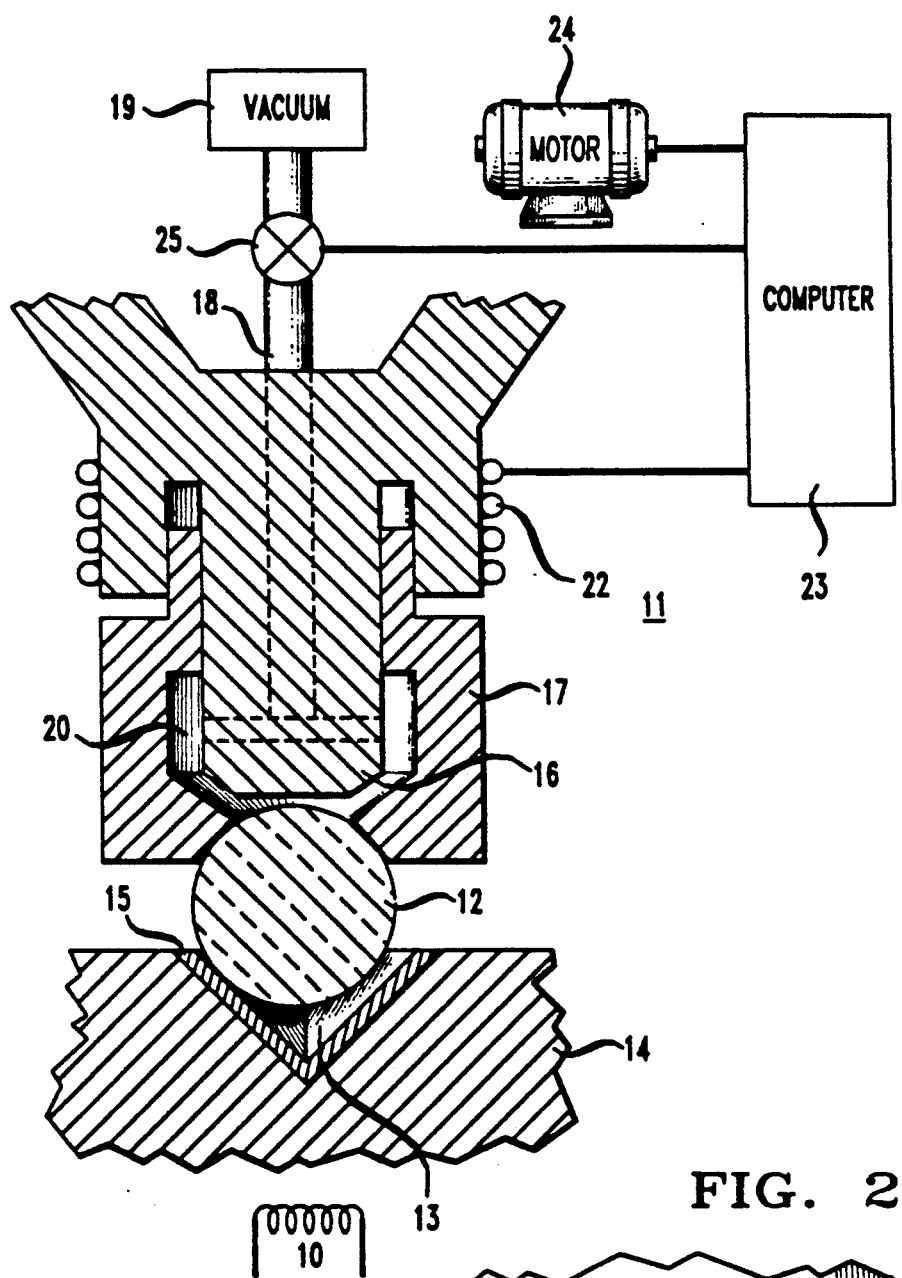
FIG. 1 is a schematic sectional view of placement and bonding apparatus at one stage of its operation in accordance with an illustrative embodiment of the invention.
Figure 2:
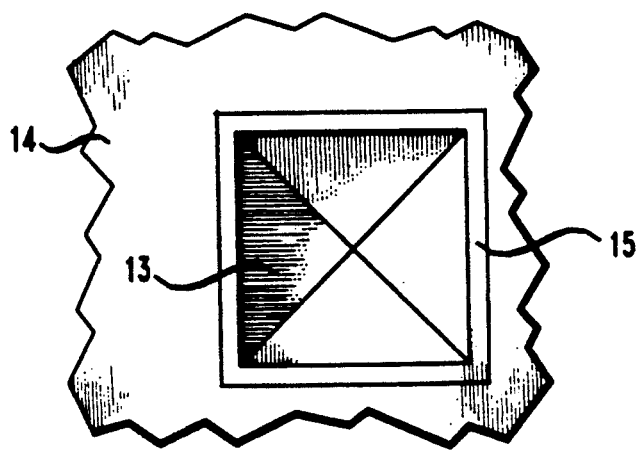
FIG. 2 is a top view of a pyramidal depression within which a ball lens can be mounted.

Referring now to FIG. 1, there is shown schematically a placement and bonding apparatus 11 for picking up a curved optical element, illustratively a ball lens 12, placing it at a proper location such as in a depression 13 of a silicon substrate 14, and bonding it to the substrate in accordance with an illustrative embodiment of the invention. The depression 13 is illustratively made by etching into a properly mounted crystalline silicon substrate to make a pyramid-shaped depression, a top view of which is shown in FIG. 2. The sidewalls can be very precisely located using known techniques of masking and etching and may be coated with a thin layer 15 of aluminum.

The apparatus 11 comprises a bonding tool 16 which is surrounded by a retracting element holder 17. A vacuum channel 18 in the bonding tool communicates with a vacuum source 19 to apply a partial vacuum in a gap 20 between the bonding tool 16 and the element holder 17. A solenoid winding 22 surrounds a portion of the placement and bonding tool 11 which, when activated, causes a retraction of the element holder 17 to a higher vertical location within the apparatus 11, as shown in FIG. 3.

The apparatus 11 is preferably part of a robotic apparatus controlled by a computer 23. It is moveable in X, Y and vertical directions by a motor or motors shown schematically at 24, controlled by the computer 23. In operation, apparatus 11 would normally be moved first to a tray of ball lenses. Tool 17 contacts a ball lens, with the vacuum activated by the computer 23 through a valve 25, to cause the ball lens 12 to adhere to the element holder 17. The apparatus 11 then is moved to a location over the depression 13 of the substrate 14, as shown in FIG. 1. The ball lens 12 may typically be three hundred microns in diameter, and it is therefore difficult to center the ball lens exactly at the apex of the pyramidal depression 13, required for thermo-compression bonding of the ball lens to the substrate. Therefore, in accordance with the invention, after rough placement, as shown in FIG. 1, which may not be precisely centered with respect to the depression 13, the vacuum is released by operation of the valve 25, whereupon the ball lens 12 is allowed to drop by gravity into the depression 13.

Figure 3:
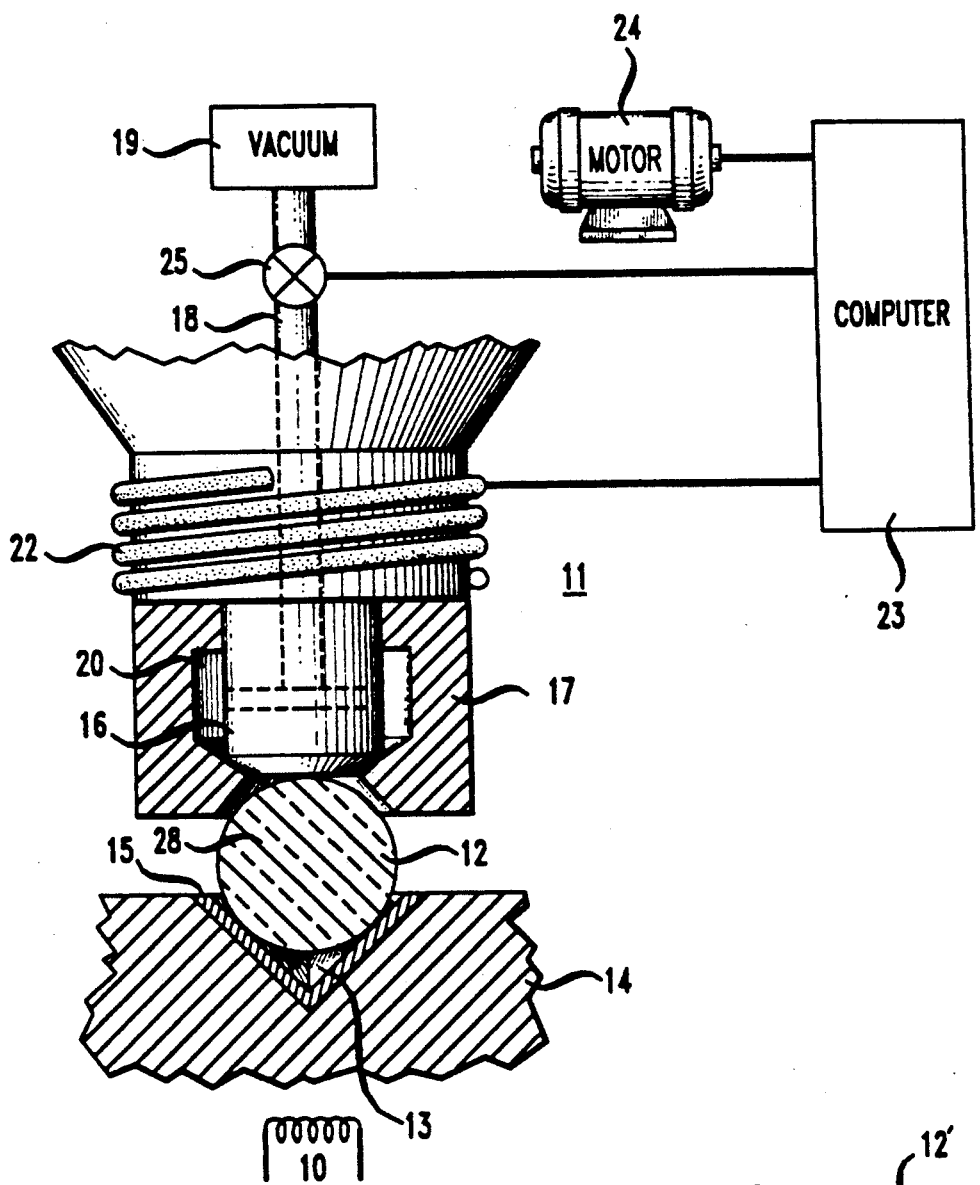
FIG. 3 is a view of the apparatus of FIG. 1 at a subsequent stage of its operation.

Referring to FIG. 3, simultaneously with the release of the vacuum, the computer actuates solenoid 22 to retract holder 17 in a vertical upward direction, as shown. This retracting allows a lower horizontal surface of the bonding tool 16 to make contact with the ball lens 12. Thereafter, the computer actuates motor 24 to cause the apparatus 11 to move vertically downwardly.

As pointed out in the Coucoulas application, successful thermocompression bonding of glass to aluminum simply requires the simultaneous application of heat and pressure. The substrate 14 may be heated by a heater schematically shown at 10, while pressure on the ball is provided by the bonding tool 16 exerting a downward force on the ball lens 12. With a spherical glass lens having a diameter of three hundred microns, the applied force may be six hundred grams, and the heat applied may be sufficient to raise the temperature of the substrate 14 to three hundred fifty degrees Centigrade. The pressure may be applied for three seconds to effect the thermo-compression bond. Thereafter, the computer 23 causes the apparatus 11 to rise from the ball lens 12 and to commence another cycle of operation.

It should be noted if downward force were applied by the element holder 17 as shown in FIG. 1, the forces would not be properly distributed against opposing sidewalls of depression 13, the ball lens 12 would not be properly centered, and reliable bonds to the sidewalls would not be formed; thus, release of the lens 12 into the depression prior to bonding is required. After release, the ball lens 12 centers itself by gravity. Thereafter, the bottom horizontal surface of bonding tool 16 should have a sufficient area to insure contact with the centered ball lens. That is, if the positioning accuracy of the tool is, say, five microns, the length and width of the lower surface of bonding tool 16 should be at least ten microns to insure contact of the bonding tool to the ball lens after centering. As can be appreciated from FIG. 2, the bonding tool applies force that is equally distributed to three opposing sidewalls 15.

Figure 4:
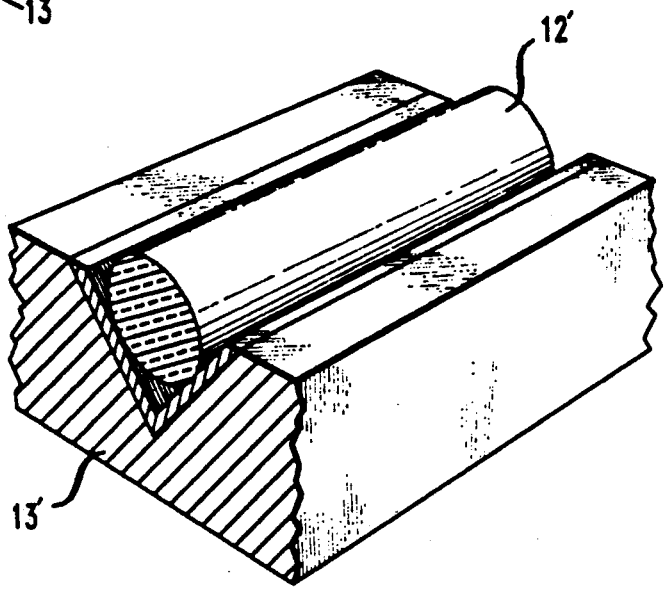
FIG. 4 is a perspective view showing how an optical fiber can be mounted in a V-groove.

If so desired, the substrate 14 may contain intersecting V-grooves (not shown) for the purpose of defining the position of ball lens 12, as is described in the copending patent application of Ackerman et al., Ser. No. 572,592, filed Aug. 27, 1990. Alternatively, as shown in FIG. 4, the element 12 may constitute an optical fiber 12' which is mounted in a V-groove 13'. In apparatus that we have built, surfaces 28 (FIG.3) of holder element 17 were flat and could accommodate both spherical glass balls and cylindrical optical fibers. Alternatively, the surfaces 28 could be made to match the surfaces only of a cylinder or only of a sphere if so desired. The apparatus 11 which was built and tested was operated as part of a Seiko XY3000 robot, commercially available from Seiko Instrument, Ltd., Torrance, California.

As mentioned in the Coucoulas application, acoustic energy can be used as an alternative to heat in the bonding step. The invention is also applicable to other methods of bonding using various solders and adhesives. Where epoxy adhesive is used, for example, downward pressure on the optical element is often required for centering the element, seating it, and redistributing the fluid epoxy. Likewise, the use of various solders requires a downward force to insure reliable seating and bonding. Thus, an embodiment using an adhesive is identical to the illustrative embodiment except that, prior to deposit of the ball lens, either the ball lens or the sidewalls are coated with a fluid adhesive and, after the operation, the adhesive is allowed to harden. An embodiment using solder is identical to the illustrative embodiment except that, prior to deposit of the ball lens, either the lens or the sidewalls are coated with solder which after deposit is heated to a fluid condition and, after the operation, is cooled and allowed to be hardened. Various other embodiments and modifications may be made by those skilled in the art without departing from the spirit and scope of the invention.

I claim:

1. A method for bonding a curved optical element to slanted opposing sidewalls of a substrate comprising the steps of:

providing a retracting element holder surrounding a bonding tool;

providing a vacuum channel communicating with the holder;

contacting the holder to the element and applying a vacuum to the vacuum channel to cause the element to adhere to the holder;

moving the element to a location above the slanted opposing sidewalls of the substrate;

releasing the vacuum, thereby to allow the element to nest between opposing sidewalls;

causing the holder to retract vertically upwardly so as to expose a bonding surface of the bonding tool;

and lowering the bonding tool to contact the element and force it against the opposing sidewalls.

2. The method of claim 1 wherein:

the element has a substantially circular cross section;

the slanted opposing sidewalls form substantially a V-shaped configuration, whereby when the vacuum is released, the element nests symmetrically with respect to the V-shape;

and the surface of the bonding tool that contacts the element is a substantially flat horizontal surface.

3. The method of claim 2 wherein:

the element is a cylindrical optical fiber having a central axis;

the slanted sidewalls define a V-shaped channel;

and when the vacuum is released, at least part of the optical fiber nests in the channel with its central axis parallel to said channel.

4. The method of claim 2 wherein:

the element is a spherical glass ball;

the slanted sidewalls define a pyramid-shaped depression in the substrate;

and when the vacuum is released, the glass ball nests in the depression with its surface contacting at least three opposing sidewalls.

5. The method of claim 1 wherein:

the sidewalls are coated with aluminum;

the curved element has an outer surface of glass;

and the sidewalls are heated during the lowering of the bonding tool step.

6. The method of claim 5 wherein:

the sidewalls are heated to a temperature of approximately three hundred fifty degrees Centigrade;

and during the lowering step, the bonding tool is pressed against the curved element with a force of approximately six hundred grams.

7. The method of claim 1 wherein:

a first part of the vacuum channel extends through an interior of the bonding tool and a second portion of the vacuum channel is defined between an inner surface of the element holder and an outer surface of the bonding tool.

8. The method of claim 1 wherein:

an adhesive is provided between the element and the sidewalls to aid in bonding the element to the sidewalls.

9. The method of claim 1 wherein:

a solder is provided between the element and the sidewalls and is heated to a fluid condition prior to lowering the bonding tool.

10. The method of claim 6 wherein:

the element is a spherical glass ball;

the slanted sidewalls define a pyramid-shaped depression in the substrate;

and when the vacuum is released, the glass ball nests in the depression and contacts three opposing sidewalls.

11. The method of claim 5 wherein:

the element is a cylindrical optical fiber having a central axis;

the slanted sidewalls define a V-shaped channel;

and when the vacuum is released, at least part of the optical fiber nests in the channel with its central axis parallel to said channel.

* * * * *